United States Patent
Yu et al.

(10) Patent No.: US 7,707,190 B2
(45) Date of Patent: Apr. 27, 2010

(54) METHOD FOR RESTORING BACKUP DATA

(75) Inventors: Lindeng Yu, Taipei Hsien (TW); Zhong-Yang Wang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 344 days.

(21) Appl. No.: 11/755,750

(22) Filed: May 31, 2007

(65) Prior Publication Data
US 2007/0226278 A1  Sep. 27, 2007

Related U.S. Application Data

(62) Division of application No. 10/707,708, filed on Jan. 6, 2004, now abandoned.

(30) Foreign Application Priority Data
Dec. 4, 2003  (TW) .............................. 92134148 A

(51) Int. Cl.
G06F 7/00  (2006.01)
(52) U.S. Cl. ...................................... 707/680; 707/681
(58) Field of Classification Search ........................ None
See application file for complete search history.

(56) References Cited

U.S. PATENT DOCUMENTS

| | | | |
|---|---|---|---|
| 6,295,541 B1 * | 9/2001 | Bodnar et al. | 707/203 |
| 6,651,077 B1 * | 11/2003 | East et al. | 707/204 |
| 6,950,836 B2 * | 9/2005 | Lohn et al. | 707/204 |
| 2004/0193953 A1 * | 9/2004 | Callahan et al. | 714/15 |
| 2006/0020828 A1 * | 1/2006 | Aihara et al. | 713/193 |
| 2008/0235299 A1 * | 9/2008 | Haselton et al. | 707/204 |

* cited by examiner

Primary Examiner—Cam Y T Truong
(74) Attorney, Agent, or Firm—Jianq Chyun IP Office

(57) ABSTRACT

A method for restoring backup data in an electronic system is provided. The method provides a backup data file, and the backup data file includes at least one record of application data. Then, an application program corresponding to the application data is searched within a registry of the electronic system. If it is found, the application data is restored; otherwise, the application data is not restored. The present invention further provides a method for restoring backup data in a mobile system. The method provides a backup data file, and the backup data file includes a self-restore program. Then, the self-restore program is performed in the mobile device to restore data. Therefore, the present invention can restore data to the mobile device without having to install additional restore program.

4 Claims, 6 Drawing Sheets

METHOD FOR RESTORING BACKUP DATA

CROSS-REFERENCE TO RELATED APPLICATION

This application is a divisional of a prior application Ser. No. 10/707,708, filed Jan. 6, 2004, which claims the priority benefit of Taiwan application serial no. 92134148, filed Dec. 4, 2003, now pending. The entirety of the above-mentioned patent application is hereby incorporated by reference herein and made a part of this specification.

BACKGROUND OF THE INVENTION

1. Field of the Invention

The present invention relates to a method for restoring backup data, and more particularly, to a method for restoring backup data in a mobile device (e.g. PDA).

2. Description of the Related Art

Various electronic apparatus are commonly used in modern life to process our daily activities, such as communication, calendar management, and document preparation. Accompanying with the technology progress, various electronic apparatus are made thinner and smaller for easy carry. The mobile device, such as the Personal Digital Assistant (PDA) and the mobile phone are the electronic apparatus that are made in consider of easy carry. Usually, the data recorded in the electronic apparatus is critical to the users, if the data recorded in the electronic apparatus is damaged due to any accident, it will be a great loss and will bring a significant inconvenience to the users. Therefore, frequently backing up data becomes a routine job for the users using the electronic apparatus.

For example, since the characteristic of smaller size and versatile functions, the PDA is gradually accepted by the users. In the PDA, the user can build up customer information, send/receive e-mail, manage calendar, roughly edit/read document, and perform like operation with the help of a Personal Information Manager (PIM). The PDA also provides a function similar to the Personal Computer (PC) for allowing user to install various application programs. The PDA can further provide multimedia functions, such as playing MP3 and movies by installing the relevant application programs. Therefore, the important PIM data and the application data generated by various application programs (e.g. Word document files and MP3 music files) are recorded in the PDA. In order to prevent the data from carelessly damaging, a backup program is commonly installed in the PDA for users to backup the important data. The backup data mentioned above is commonly saved outside the PDA, for example, it is saved in a PC which is connected to the PDA via a link.

Analyzing the data/program saved in the PDA, it is found that they can be roughly classified into following categories: the system file/device driver, the registry, the user-installed application program and its related dynamic-link library (DLL), the application data generated by the application program, and the PIM data. The user can restore the backup data to the original PDA at any time with the help of non-regularly backing up the internal data of the PDA. However, it is common that we have to load the backup data of the original PDA into another PDA and restore it therein, for example, in the case of replacing the PDA with a new one. FIG. 1A is a schematic block diagram illustrating the backing up data between different PDAs. FIG. 1B is a schematic block diagram illustrating a PDA 2 of FIG. 1A after the data had been restored to it using a conventional technique. Referring to both FIG. 1A and FIG. 1B, it is assumed that the data in the PDA 110 is to be backed up and the backup data file 130 is to be obtained, the data of the PDA 110 is restored into the PDA 120 by using the backup data file 130. Wherein, the system file/device driver 112 is commonly embedded in a read only memory (ROM) inside the PDA 110, thus it is not possible to rewrite it, and it will not disappear due to the PDA hardware reset. Therefore, its backup is not required.

When performing the backup operation, the PDA 110 copies its registry 111, the PIM data 114, the user-installed application program DLL 113, and various application programs and its application data 115 into the backup data file 130. After the backup data file 130 is loaded into the PDA 120, the data in the backup data file 130 is restored, such that the registry 121a, the PIM data 124a, the application program DLL 123a, and various application programs and its application data 125a are replaced with the registry 121b, the PIM data 124b, the application program DLL 123b, and various application programs and its application data 125b.

The system setup and hardware device drivers among different PDAs are not all the same. Therefore, if the data is just roughly restored (replaced) by using the above method, the system may be crashed due to the difference among the PDA hardware, the system file/device driver, the registry, the application program as well as the difference existed in various application programs.

Further, even the system crash problem mentioned above does not exist, for example, in the case of restoring the backup data to the same PDA, in the conventional art, in order to restore the data, it is required to install a backup/restore program which is used in generating the backup data file (it is because all programs are disappeared after the hardware is reset). Therefore, it is very inconvenient to the user.

SUMMARY OF THE INVENTION

In the light of the above problems, it is an object of the present invention to provide a method for restoring backup data. The method detects a correlation between the system to which the data is restored and the system where the data is backed up from previously, then it is determined which backup data can be restored, so as to avoid the system crash problem due to the inconsistency between the restore data and system.

It is another object of the present invention to provide a method for restoring backup data. With such method, the mobile device can execute a self-restore program included in the backup data file and perform the data restore operation without having to install additional restore program.

The present invention provides a method for restoring backup data in an electronic system. The method comprises providing a backup data file, and the backup data file includes at least one record of application data. Then, an application program corresponding to the application data is searched within a registry of the electronic system. If it is found, the application data is restored; otherwise, the application data is not restored.

According to a method for restoring backup data described in an embodiment of the present invention, the backup data file further comprises a Personal Information Manager (PIM) data, and the method for restoring backup data further comprises a step of reading and restoring the PIM data to the electronic system.

According to a method for restoring backup data described in an embodiment of the present invention, the backup data file further comprises an original model data, and the method for restoring backup data further comprises reading the model data of the electronic system; and comparing the model data with the original model data, if they are matched, all backup data in the backup data file are restored.

The present invention further provides a method for restoring backup data in a mobile device. The method comprises providing a backup data file, and the backup data file comprises a self-restore program. Then, the self-restore program is executed in the mobile device to restore data.

According to a method for restoring backup data described in an embodiment of the present invention, wherein the step of executing the self-restore program and performing the data restore further comprises determining whether the backup data file contains the backup data or not, if it dose not, the execution of the self-restore program is terminated.

According to a method for restoring backup data described in an embodiment of the present invention, the backup data file further comprises a PIM data, and the step of executing the self-restore program and performing the data restore further comprises a step of reading and restoring the PIM data to the mobile device.

According to a method for restoring backup data described in an embodiment of the present invention, the backup data file further comprises at least one record of application data. In addition, the step of executing the self-restore program and performing the data restore further comprises searching an application program corresponding to the application data within a registry of the mobile device. If it is found, the application data is restored; otherwise, the application data is not restored.

With the present invention, since which backup data can be restored is determined by detecting the target system to which the data is restored before restoring the backup data, the present invention can prohibit the restoring (overwriting) data which is inconsistent with the target system to the target system, and further prevents the system crash problem from happening. In addition, the present invention further provides a self-restored backup data file which can restore the backup data without having to install the restore program.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Since the system setup and hardware device drivers among different electronic systems are not all the same. Therefore, if the data is just roughly restored by using the above method, the system may be crashed due to the existing difference. The PDA is exemplified for describing the present invention hereinafter. However, the present invention is not necessarily limited by it. The data/programs saved in the PDA are roughly classified into following categories: the system file/device driver, the registry, the user-installed application program and its related dynamic-link library (DLL), the application data generated by the application program, and the PIM data. Wherein, the system file/device driver is commonly embedded in a read only memory (ROM) inside the PDA, thus it is not possible to rewrite it, and it will not disappear due to the PDA hardware reset. Therefore, its backup is not required. The registry is a configuration data file of the entire system, and the registry is not suitable for other PDA, thus the registry cannot be just roughly restored/replaced. The application program and its related DLL may be relevant to the system, in order to avoid the system crash; it cannot be just roughly restored/replaced. These files may be restored through the re-installation. Since the application data and the PIM data are the user's specific personal data, and the lose will not be recovered once it is lost/damaged, these are the data most concerned by the user. Therefore, it is required to irregularly backup the application data and the PIM data, such that the recovering of the important data at any time is possible.

Figure 1A:
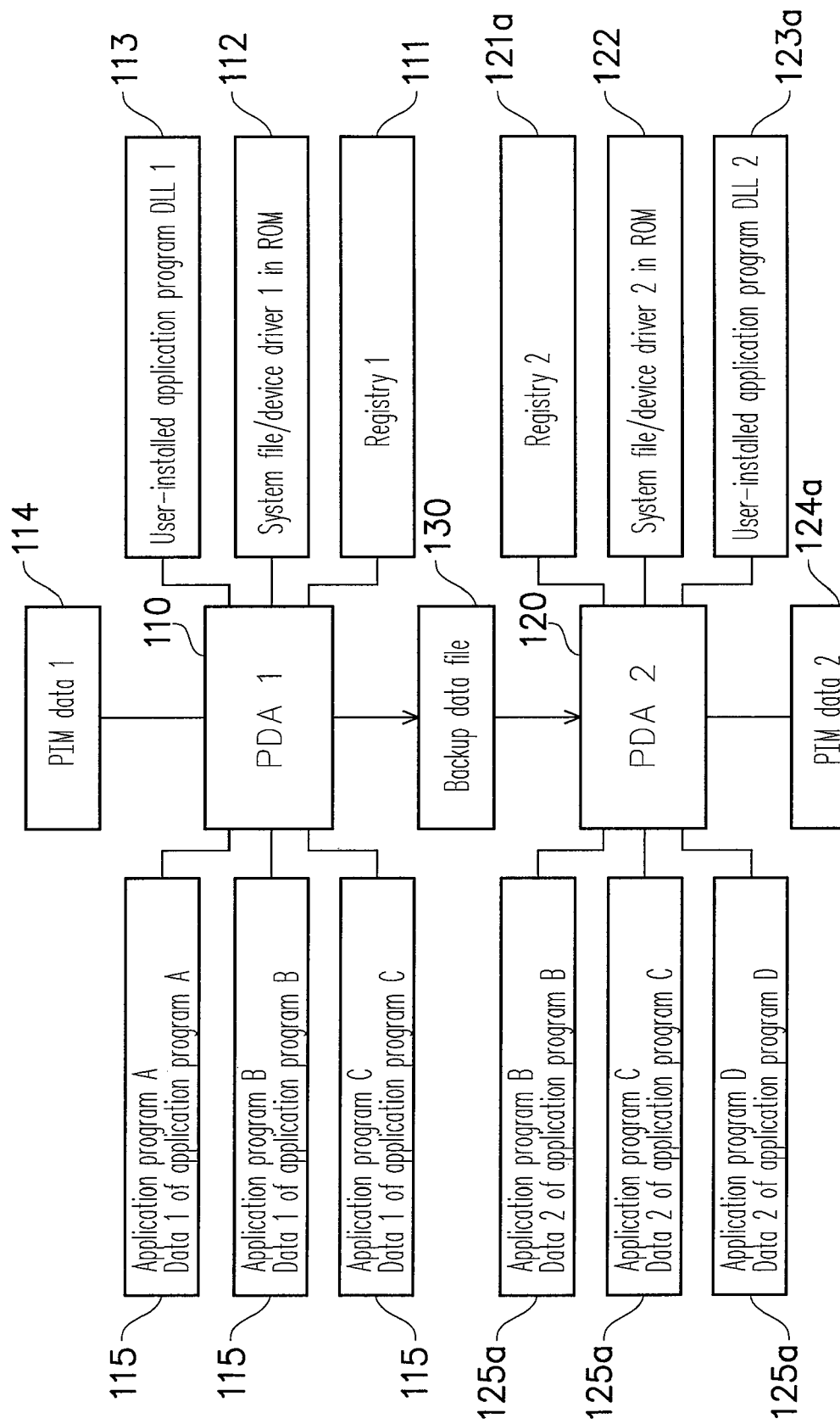
FIG. 1A is a schematic block diagram illustrating the backing up data between different PDAs.
Figure 1B:
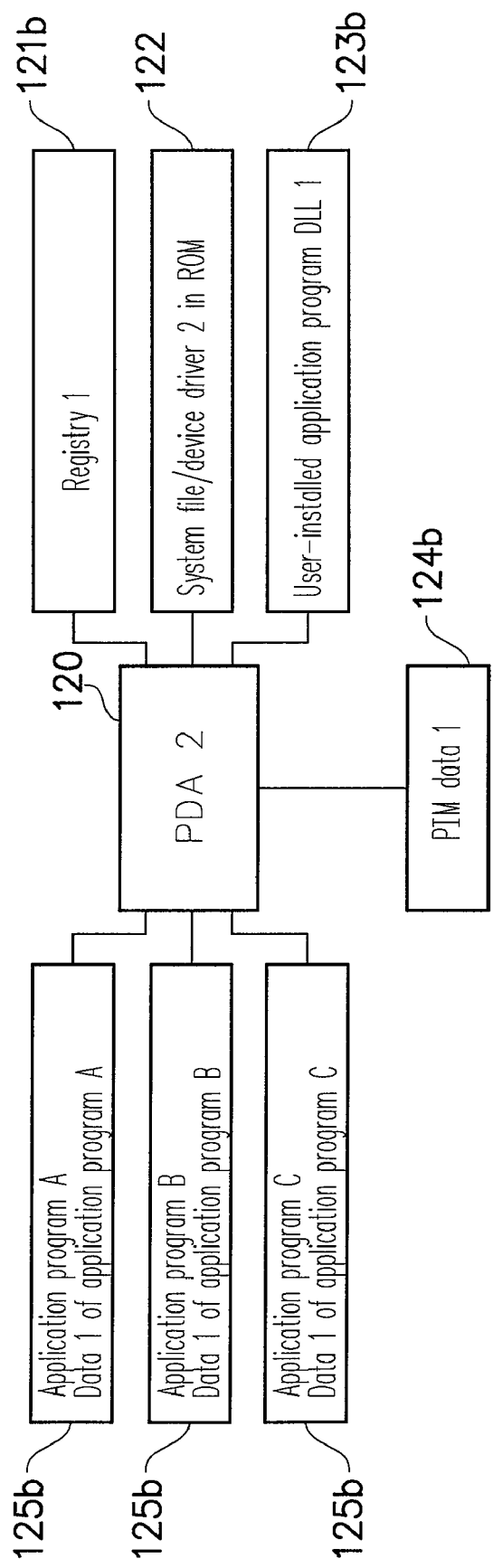
FIG. 1B is a schematic block diagram illustrating a PDA 2 of FIG. 1A after the data had been restored to it using a conventional technique.
Figure 2:
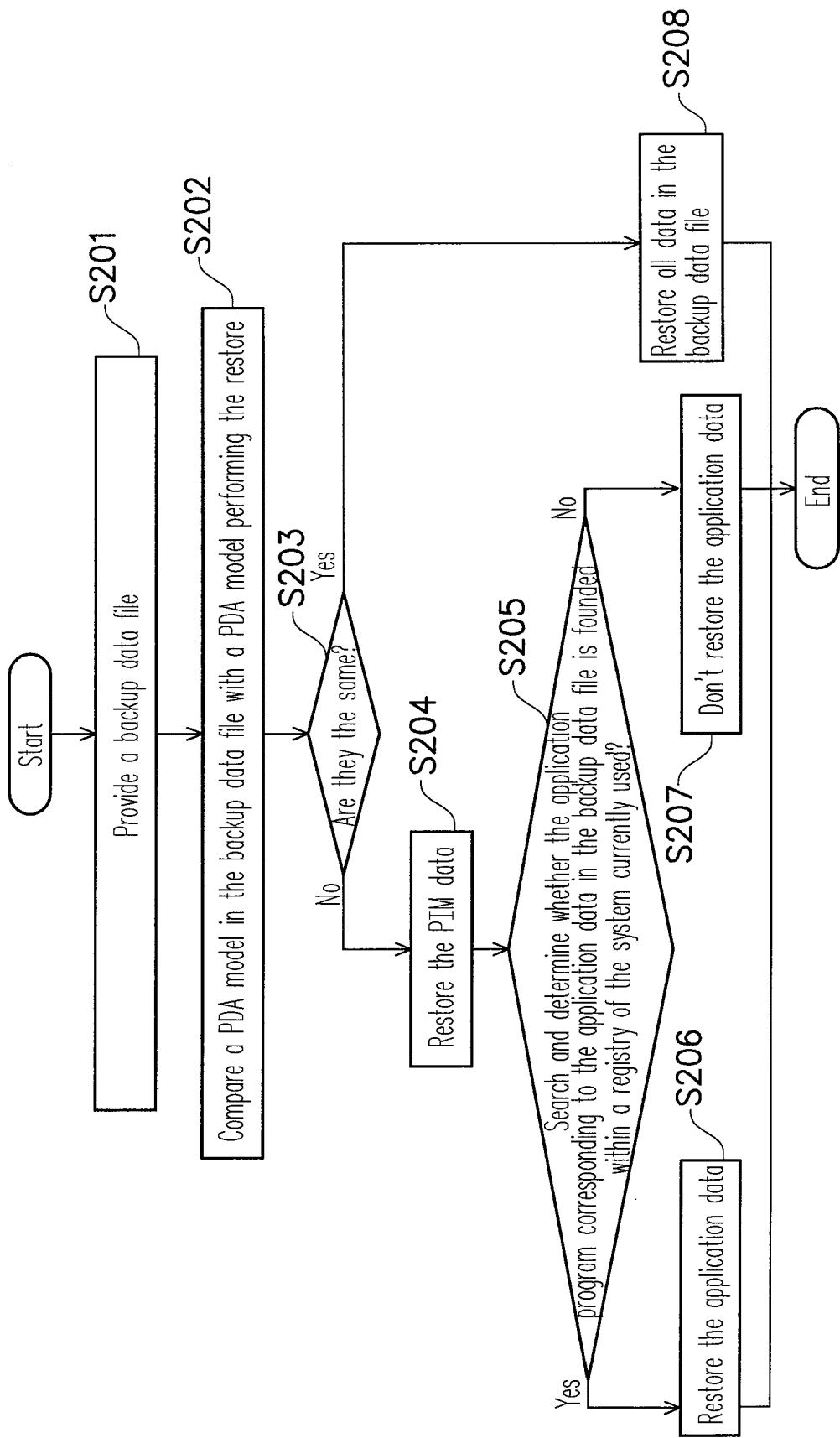
FIG. 2 is a flow chart illustrating a method for restoring backup data according to an embodiment of the present invention.
Figure 3:
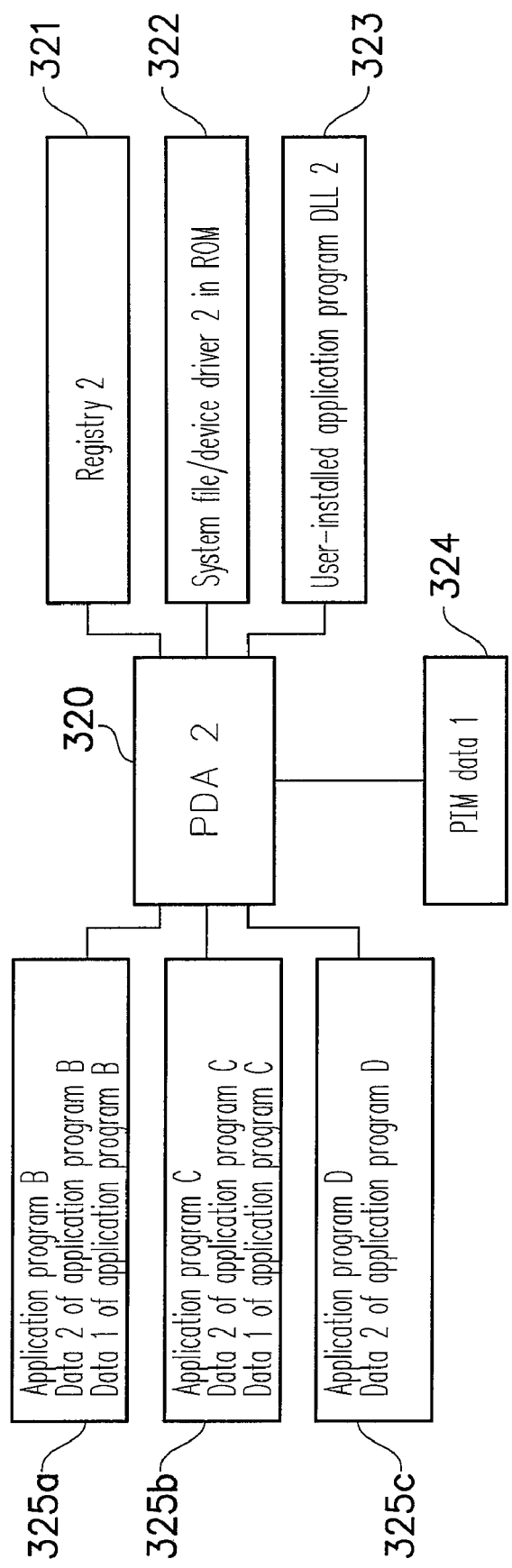
FIG. 3 is a schematic diagram illustrating an internal data of a PDA 2 in FIG. 1A after the data had been restored to it according to an embodiment of the present invention.

FIG. 2 is a flow chart illustrating a method for restoring backup data according to an embodiment of the present invention. FIG. 3 is a schematic diagram illustrating an internal data of a PDA 2 in FIG. 1A after the data had been restored to it according to an embodiment of the present invention. Referring to FIG. 1A, FIG. 2, and FIG. 3, at first, a backup data file is provided (step S201). The backup data file may be generated by backing up the internal data/file of the same PDA previously, or may be generated by backing up the internal data/file of another PDA. For example, the PDA 110 in FIG. 1A backs up its internal data, which comprises a registry 111, a DLL 113, a PIM data 114, and a plurality of application data 115 (wherein these application data corresponds to the application program A, B, and C, respectively), and generates a backup data file 130. Meanwhile, the data of the PDA 120 before the data is restored to it comprises a registry 121a, a DLL 123a, a PIM data 124a, and a plurality of application data 125a (wherein these application data corresponds to the application program B, C, and D, respectively).

In step S202 and S203, the PDA model data stored in the backup data file 130 is compared with the model of the PDA that performs the restore. If they are matched, the inconsistent problem of the backup data and the system does not exist, and the step S208 is performed, in which step all backup data in the backup data file 130 are restored to the PDA that performs the restore (for example, a conventional restore method is used in this part of the work).

If the PDA model data stored in the backup data file 130 is different from the model of the PDA that performs the restore, in order to avoid the system crash, the backup data cannot be easily restored. In such case, the PIM data is restored first (step S204). As shown in FIG. 3, the backup data of the PDA 110 is restored to another PDA (a PDA 320) according to an embodiment of the present invention. Meanwhile, the PIM data 324 is replaced with the PIM data of the PDA 110. Since the model of the PDA 110 is different from the model of the PDA 320, the registry 321 and the DLL 323 cannot be replaced.

The step S205 is then performed, in which step the application program corresponding to the application data 115 stored in the backup data file 130 is searched within a registry 321 of the PDA 320. If the application program corresponding to the application data stored in the backup data file 130 is founded in the PDA 320, the step S206 is performed to recover the corresponding application data. Otherwise, the application data is not restored (step S207). In the present embodiment, the application program B, C, and D had been installed in the PDA 320, thus the data corresponding to the application program B, C in the application data 115 stored in the backup data file 130 is restored. It is emphasized that in the present embodiment, the application data corresponding to the application program B, C in the PDA 110 is restored. However, the original application data in the PDA 320 (e.g. the application data 325*a* and the application data 325*b* shown in the diagram) is not overwritten. In addition, the application data 325*c*, which is an original application data in the PDA 320 is also reserved in the present embodiment.

Figure 4:
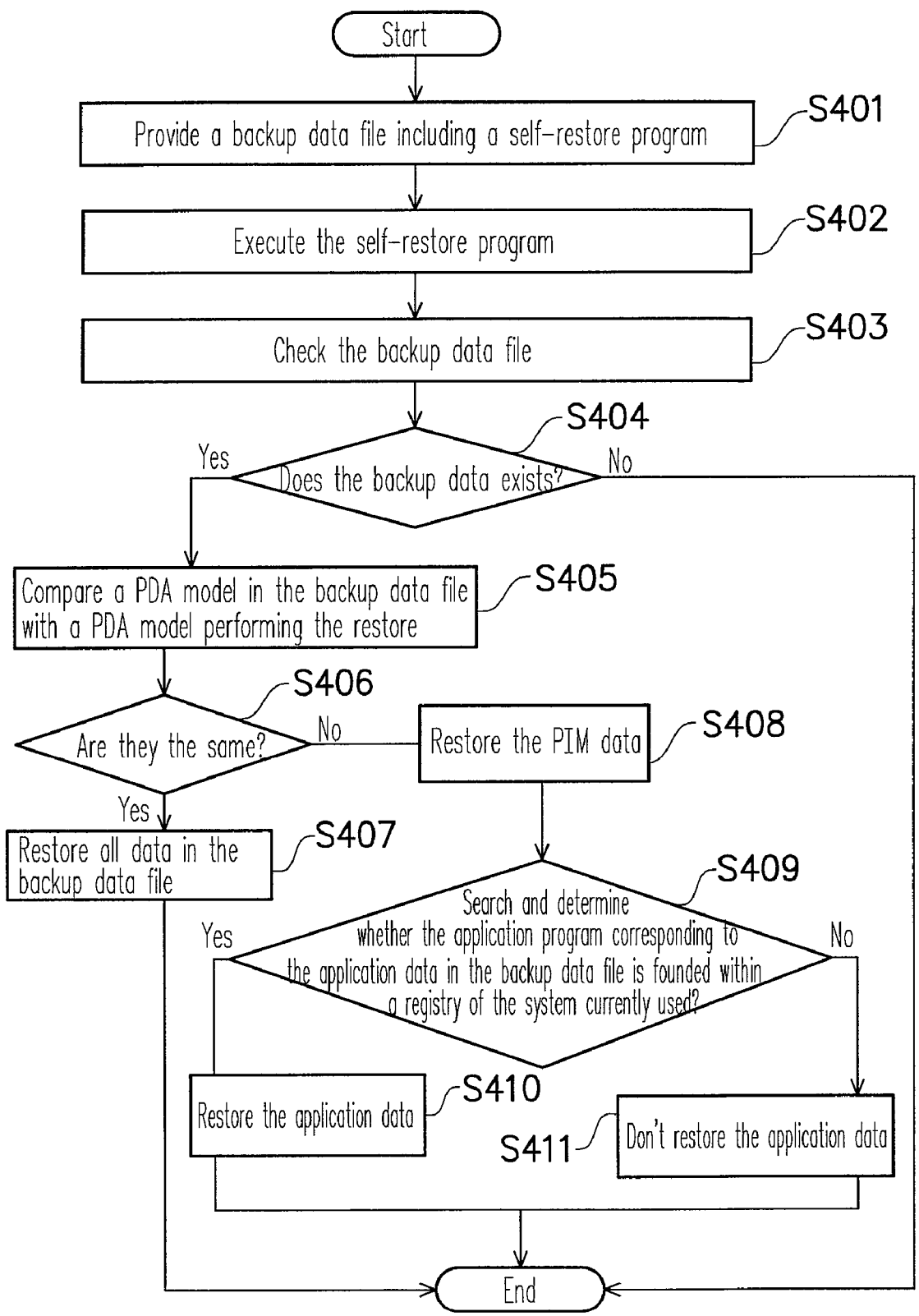
FIG. 4 is a flow chart illustrating another method for restoring backup data according to an embodiment of the present invention.
Figure 5:
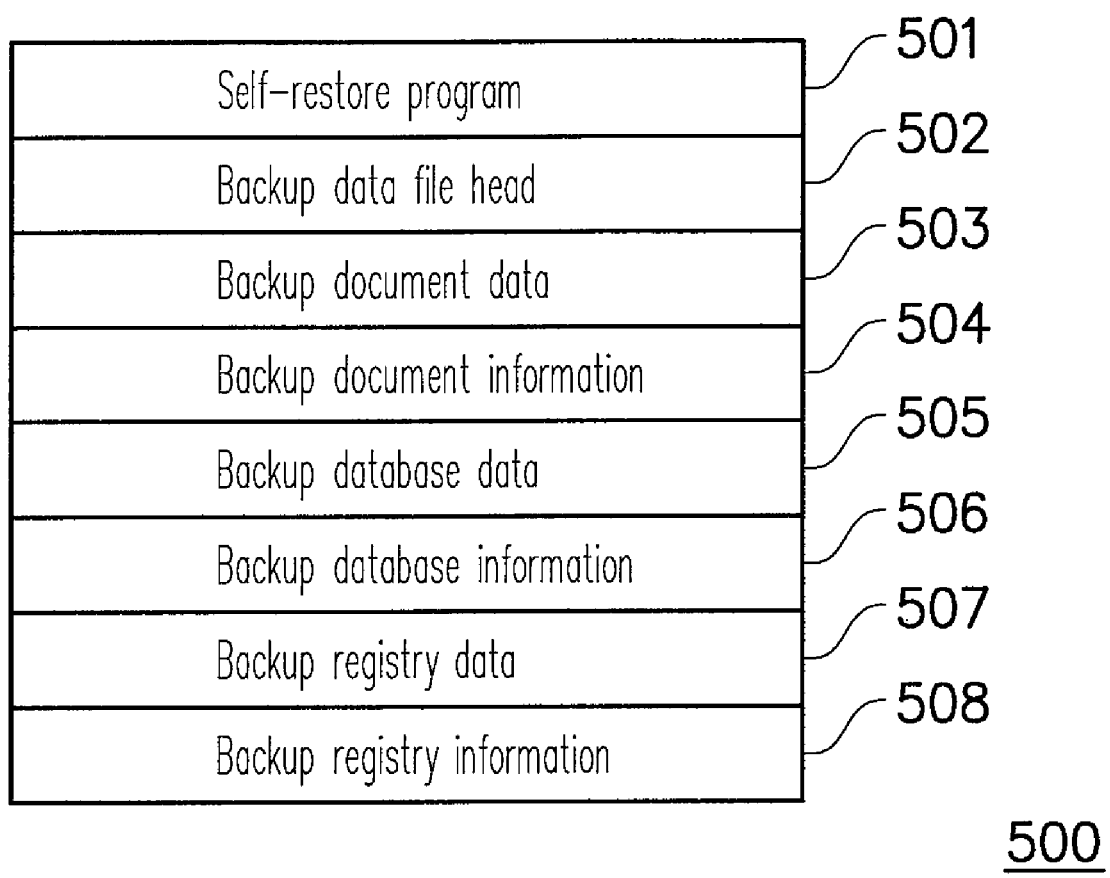
FIG. 5 is a structure diagram of a backup data file according to an embodiment of the present invention.

In accordance with an aspect of the present invention, another embodiment is exemplified hereinafter. FIG. 4 is a flow chart illustrating another method for restoring backup data according to an embodiment of the present invention. Referring to FIG. 4, at first, a backup data file is provided (step S401). Similar to the backup data file 130 in the previous embodiment, the backup data file, for example, comprises a registry, a DLL, a PIM data, and a plurality of application data. Comparing with the backup data file in the previous embodiment, the backup data file in the present embodiment further comprises a self-restore program. The backup data file of the self-restore program is such as a file complying with a Portable Executable (PE) format, and the detail information of the PE file format please referring to the related documents from Microsoft. FIG. 5 is a structure diagram of a backup data file according to an embodiment of the present invention. Referring to FIG. 5, the backup data file 500 comprises a self-restore program 501, a backup data file head 502, a backup document data 503, a backup document information 504, a backup database data 505, a backup database information 506, a backup registry data 507, and a backup registry information 508.

When it is required to restore the backup data, the self-restore program 501 in the backup data file is executed (step S402). The backup data file head 502 records how many records of data and the length of each record of the data in the backup data file 500. Thus, in step S403, it is determined whether the backup data is existed in the backup data file 500 by checking the file head 502. If it is determined that there is no backup data in the backup data file 500, in step S404, the data backup and restore process is terminated. Otherwise, the step S405 is performed. Since the process of steps S405~S411 are the same as in the previous embodiment, its detail description is omitted here.

In is known from the above embodiments that the method provided by the present invention can dynamically query the file types supported by the object system (e.g. PDA), recover the supported relevant file and data as well as all PIM data. Therefore, the present invention can avoid the system crash due to the system hardware difference, and successfully restore the important user data back to the system.

In addition, if the backup data file dose not support the self-restore function, it is required to use a restore program to restore its data. In considering the physical user environment, since the software of the mobile device is generally installed via a PC, thus once in the case that the mobile device cannot find a PC to install its software and the data has to be immediately restored, the advantages of the present invention is more obvious. Moreover, since the backup data file can be self-restored, it is no need to install the restore program, it makes the data restore more convenient.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method used in a mobile device for restoring a backup data, the method comprising:

providing a backup data file comprising a self-restore program to the mobile device under a condition in which the mobile device does not install or store any restore program via a personal computer; and when the mobile device is required to restore the backup data, executing the self-restore program in the backup data file and performing data restore in the mobile device, wherein the self-restore program and the backup data are together in unity, wherein the step of executing the self-restore program and performing the data restore comprises: determining whether the backup data is existed in the backup data file, and if there is no backup data, the executing of the self-restore program is terminated, wherein the backup data file further comprises an original model data, and the step of executing the self-restore program and performing the data restore further comprises: reading a current model data of the mobile device; and comparing the current model data with the original model data, and if the current model data is matched with the original model data, all backup data in the backup data file are restored, wherein the backup data file further comprises a Personal Information Manager (PIM) data, and the step of executing the self-restore program and performing the data restore further comprises: reading and restoring the Personal Information Manager (PIM) data to the mobile device, and wherein the backup data file comprises at least an application data, and the step of executing the self-restore program and performing the data restore further comprises: searching whether or not an application program corresponds to the application data within a registry of the mobile device, if the application program corresponds to the application data, the application data is restored; and if there is no application program corresponding to the application data, the application data is not restored.

2. The method for restoring the backup data of claim 1, wherein the mobile device is a Personal Digital Assistant (PDA).

3. The method for restoring the backup data of claim 2, wherein the PDA is a Pocket Personal Computer (PC).

4. The method for restoring the backup data of claim 1, wherein the mobile device is a Smart Phone.

* * * * *